US 8,245,829 B2

(12) United States Patent  (10) Patent No.: US 8,245,829 B2
Jayaram et al.  (45) Date of Patent: Aug. 21, 2012

(54) RING SHAPED AXIAL WEAR COMPENSATION DEVICE

(75) Inventors: Mavinkal Jayaram, Broadview Heights, OH (US); Philip George, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/012,898

(22) Filed: Jan. 25, 2011

(65) Prior Publication Data

US 2011/0147157 A1 Jun. 23, 2011

Related U.S. Application Data

(63) Continuation of application No. PCT/EP2009/004865, filed on Jul. 6, 2009.

(60) Provisional application No. 61/135,971, filed on Jul. 25, 2008.

(51) Int. Cl.
*F16D 13/75* (2006.01)
(52) U.S. Cl. ........... 192/111.2; 192/70.252; 192/111.18; 188/196 V
(58) Field of Classification Search ............ 192/111.18, 192/111.19, 111.2; 188/196 V
See application file for complete search history.

(56) References Cited

U.S. PATENT DOCUMENTS

| 4,207,972 | A | 6/1980 | Zeidler |
| 4,228,883 | A | 10/1980 | Palmer |
| 5,029,687 | A | 7/1991 | Asada et al. |
| 5,090,536 | A | 2/1992 | Asada |
| 5,645,154 | A | 7/1997 | Weidinger |
| 5,690,203 | A | 11/1997 | Link et al. |
| 5,727,666 | A | 3/1998 | Maucher |
| 6,098,772 | A | 8/2000 | Kimmig et al. |
| 6,116,396 | A * | 9/2000 | Mischler ........... 192/70.252 |
| 6,176,360 | B1 | 1/2001 | Thirion de Briel et al. |
| 6,202,817 | B1 * | 3/2001 | Link et al. ........... 192/70.252 |
| 6,357,570 | B1 | 3/2002 | Despres et al. |
| 6,394,251 | B1 | 5/2002 | de Briel |
| 6,588,565 | B1 | 7/2003 | Maucher |
| 2006/0027436 | A1* | 2/2006 | Weidinger ........... 192/70.25 |

FOREIGN PATENT DOCUMENTS

DE 4342390 6/1994
EP 1132639 9/2001

* cited by examiner

Primary Examiner — Richard M. Lorence
(74) Attorney, Agent, or Firm — Simpson & Simpson, PLLC

(57) ABSTRACT

A wear compensating device, including: at a first axial end, an annularly-shaped base element; an index trigger element connected to the base element; a first annularly-shaped element, at least partially rotatable with respect to the base element, engaged with the index trigger element, and at least partially rotatable with respect to the index trigger element; and at a second axial end, opposite the first axial end, a second annularly-shaped element with a first ramp, the second annularly-shaped element engaged with the first annularly-shaped element and rotatable with respect to the first annularly-shaped element. In response to a specified amount of displacement by a portion of the index trigger element, the first and second annularly-shaped elements are rotatable to change a circumferential position of the first ramp.

20 Claims, 12 Drawing Sheets

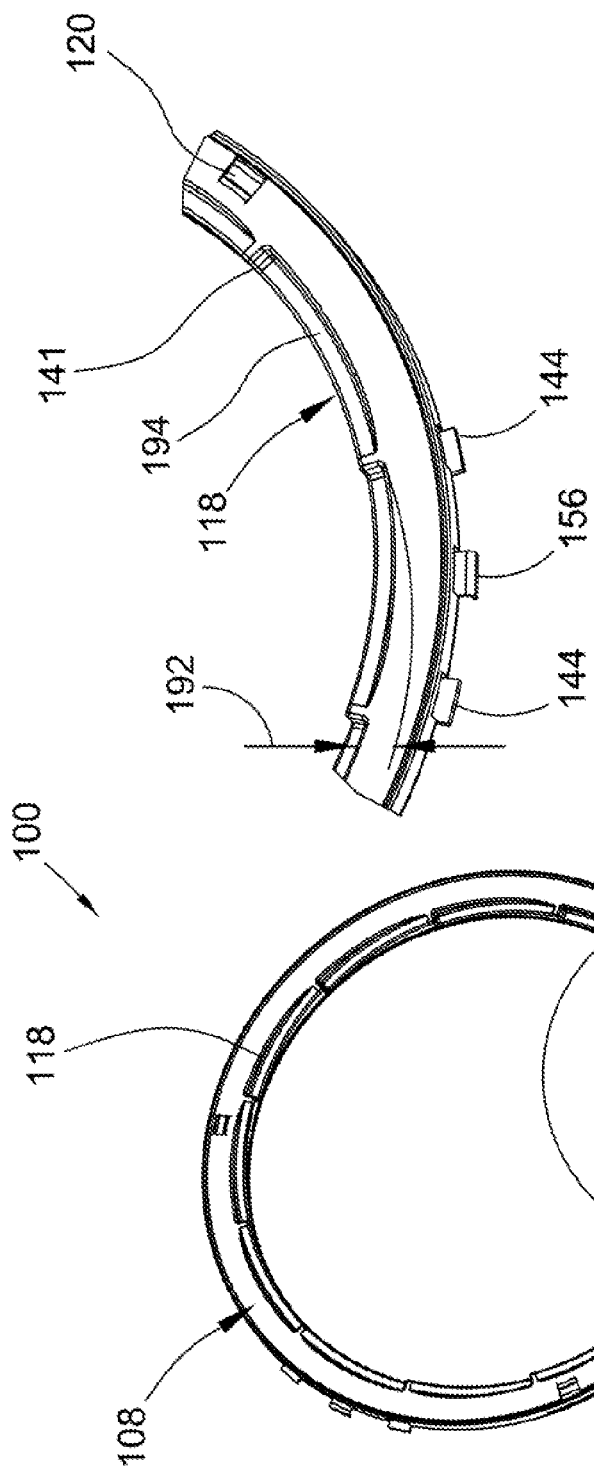

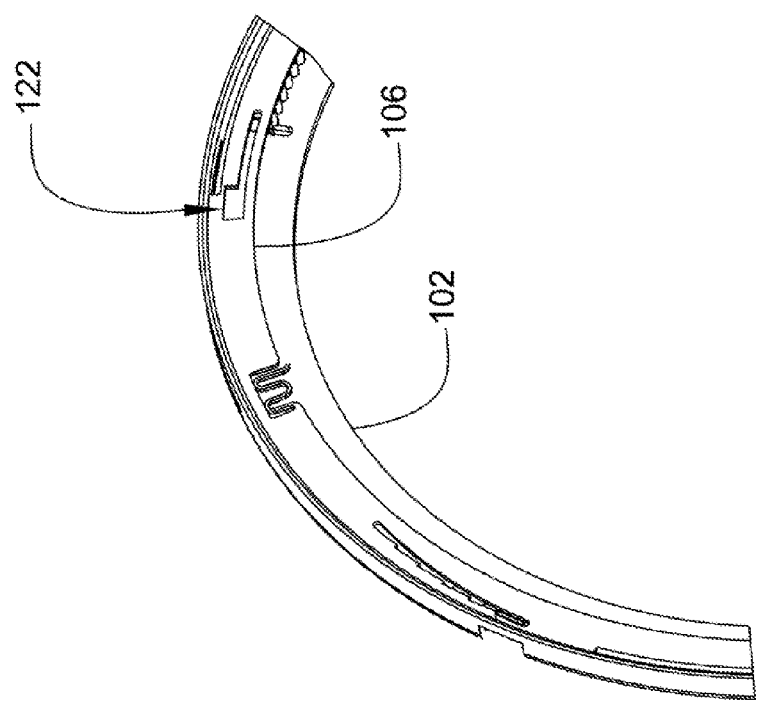
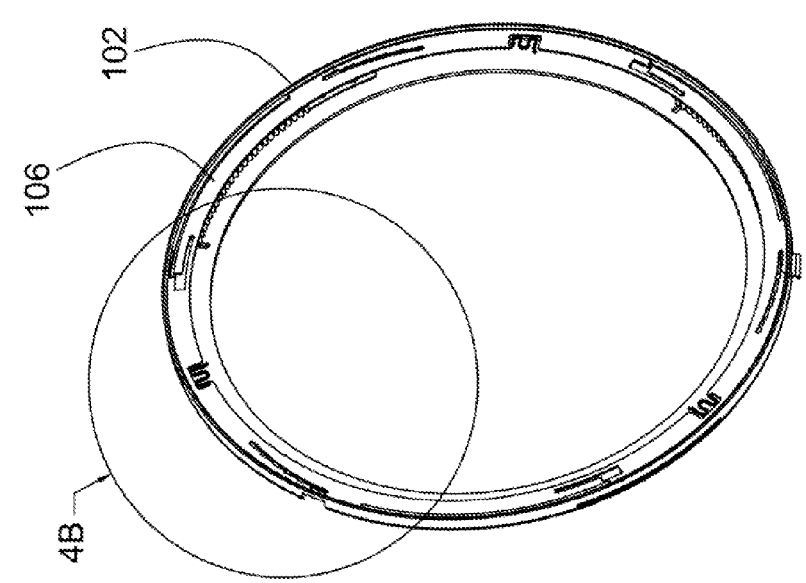
Fig. 4B
Fig. 4A

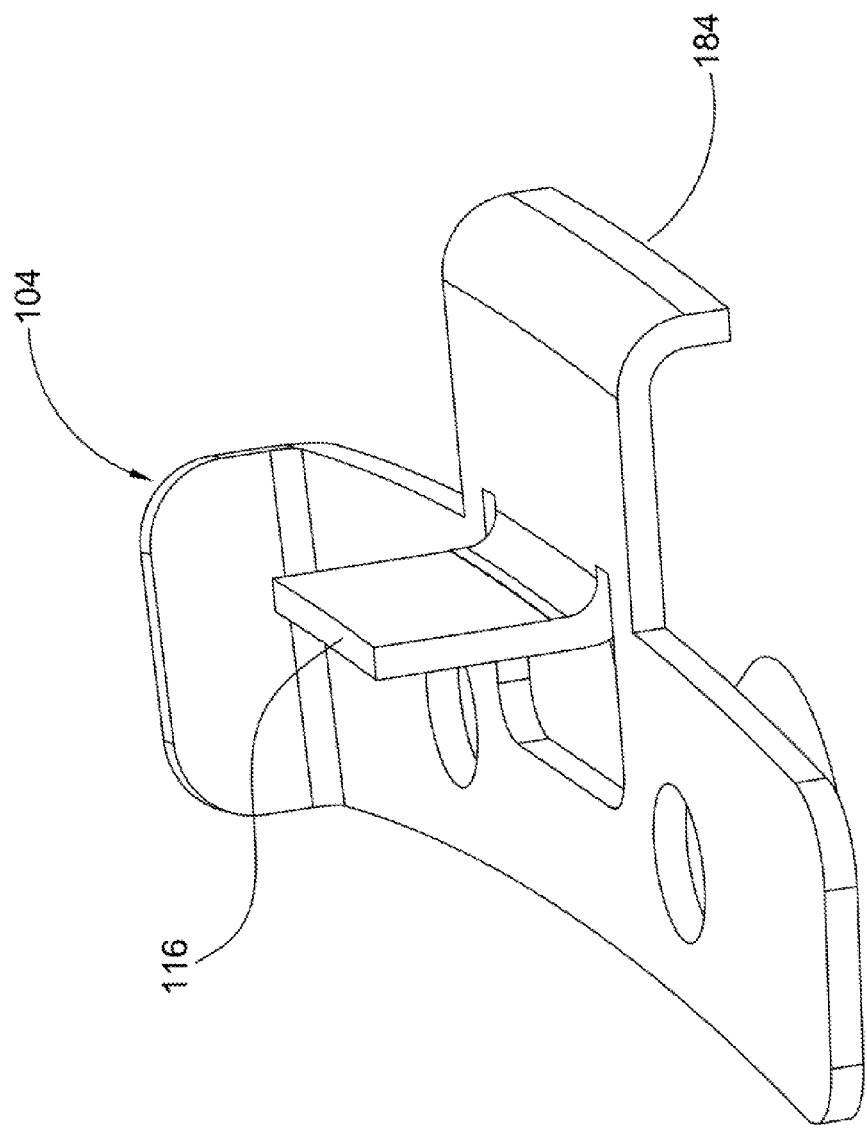

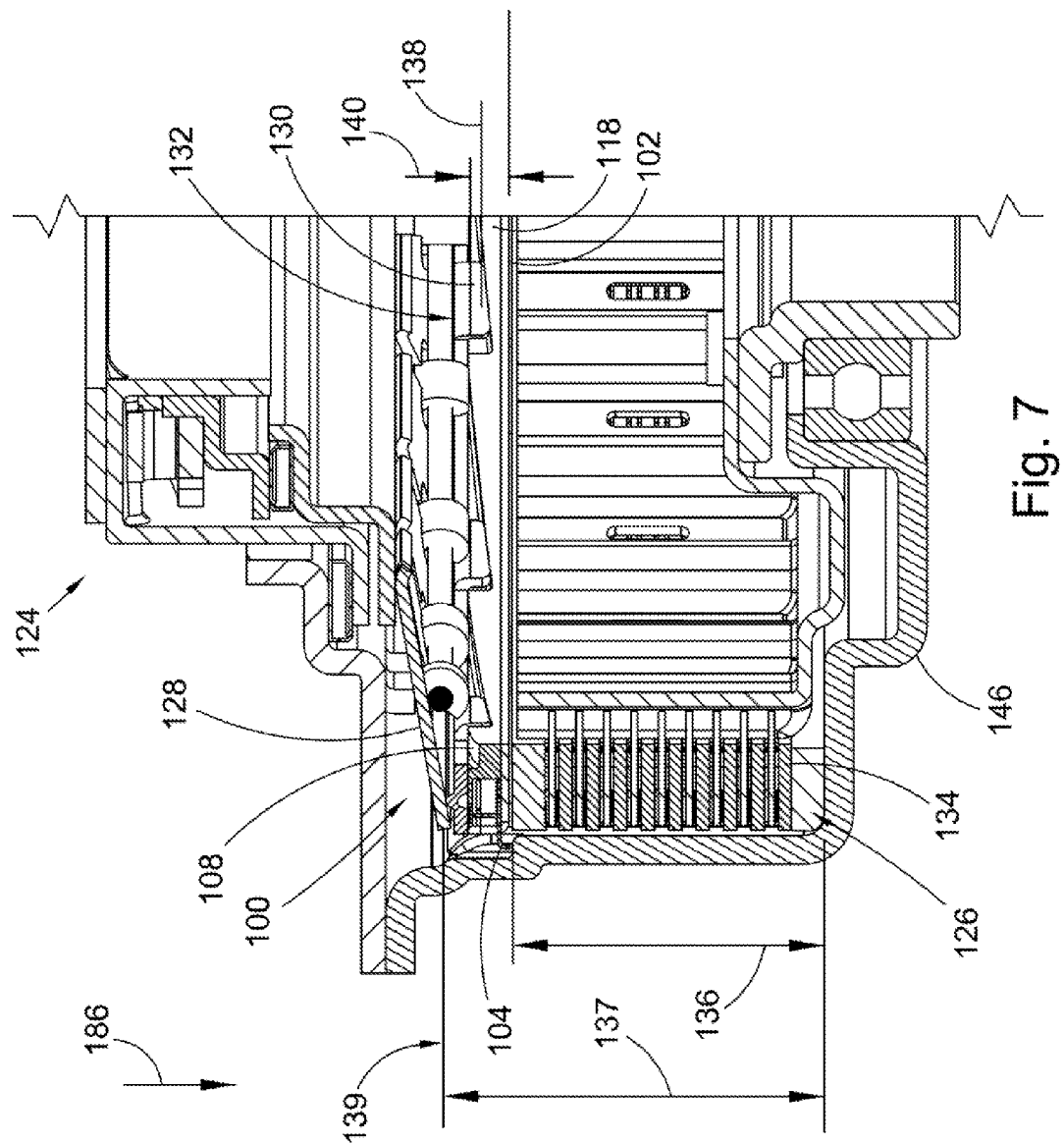

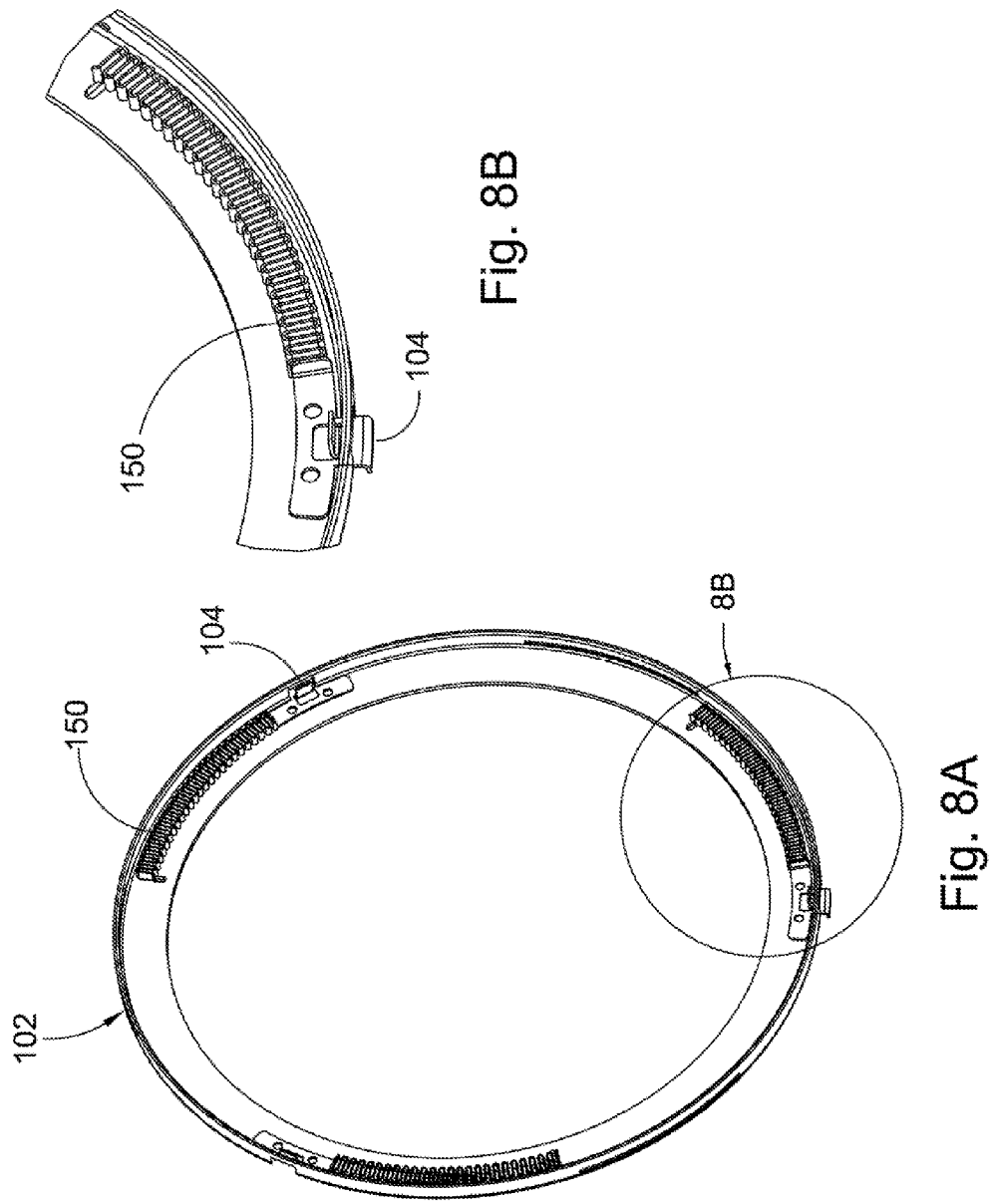

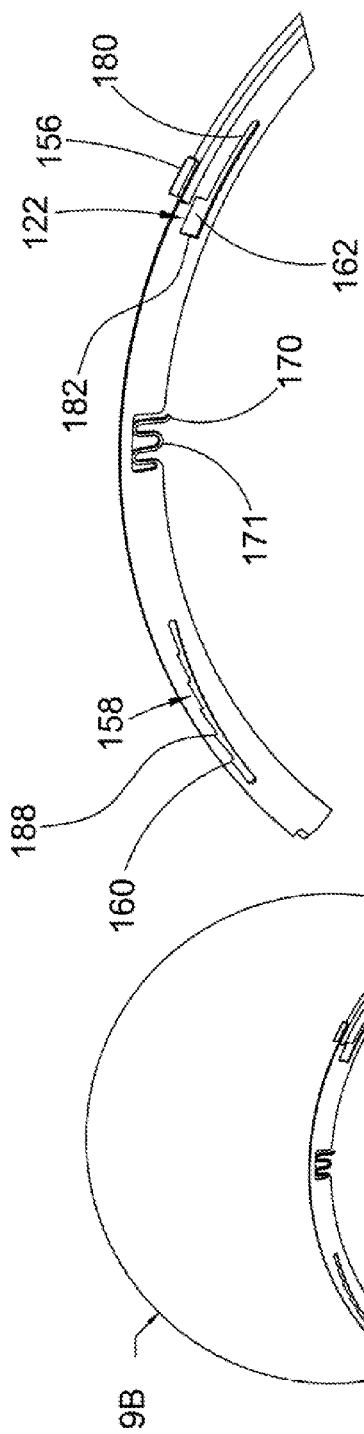
Fig. 9B
Fig. 9A

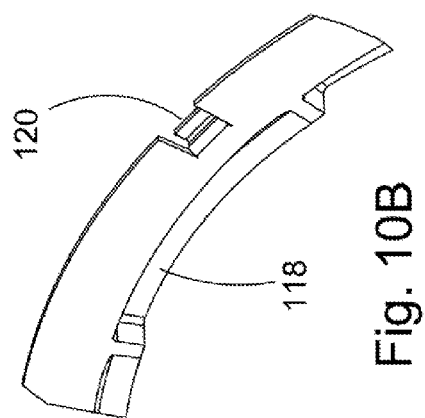
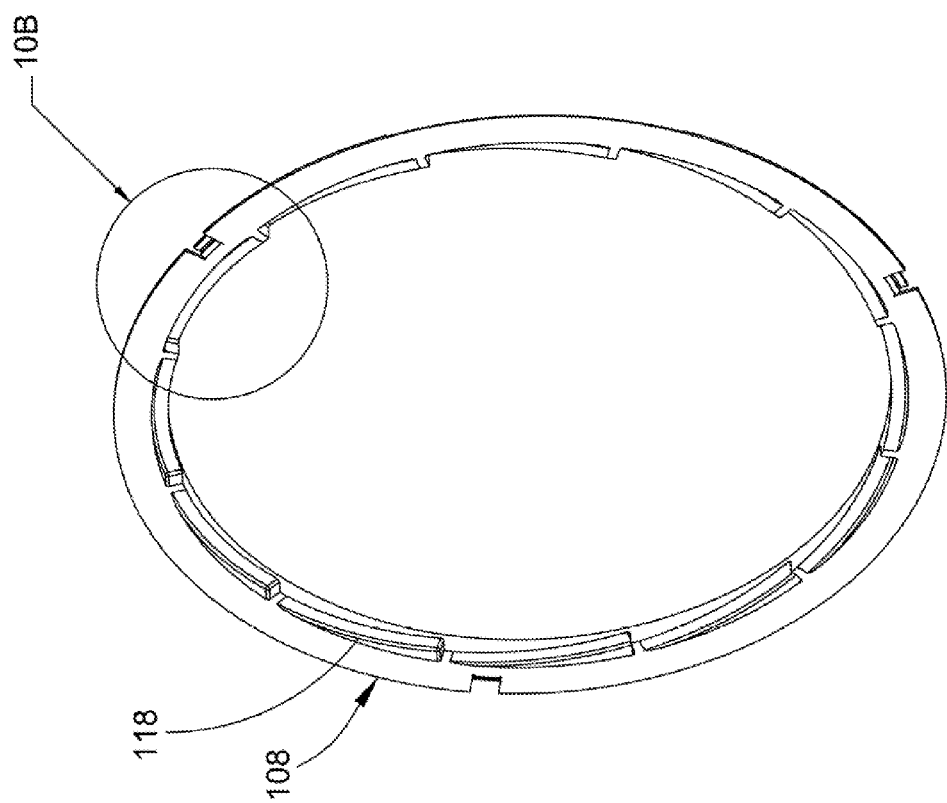

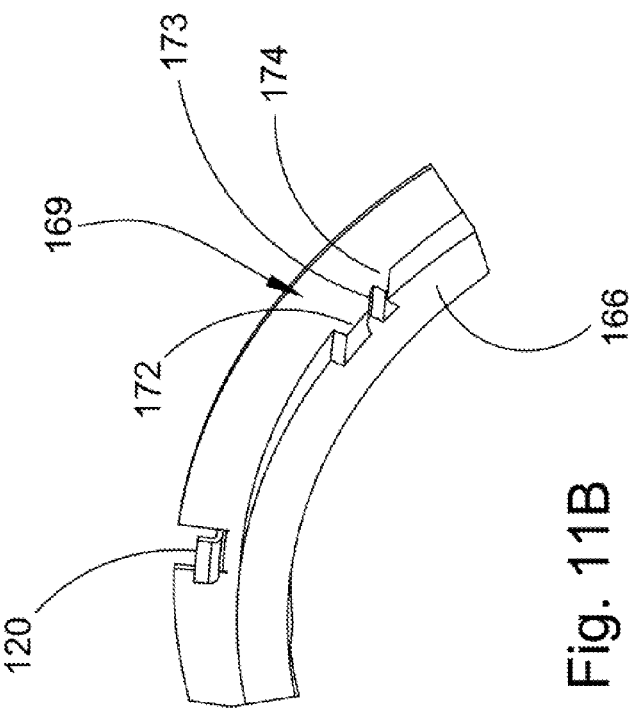
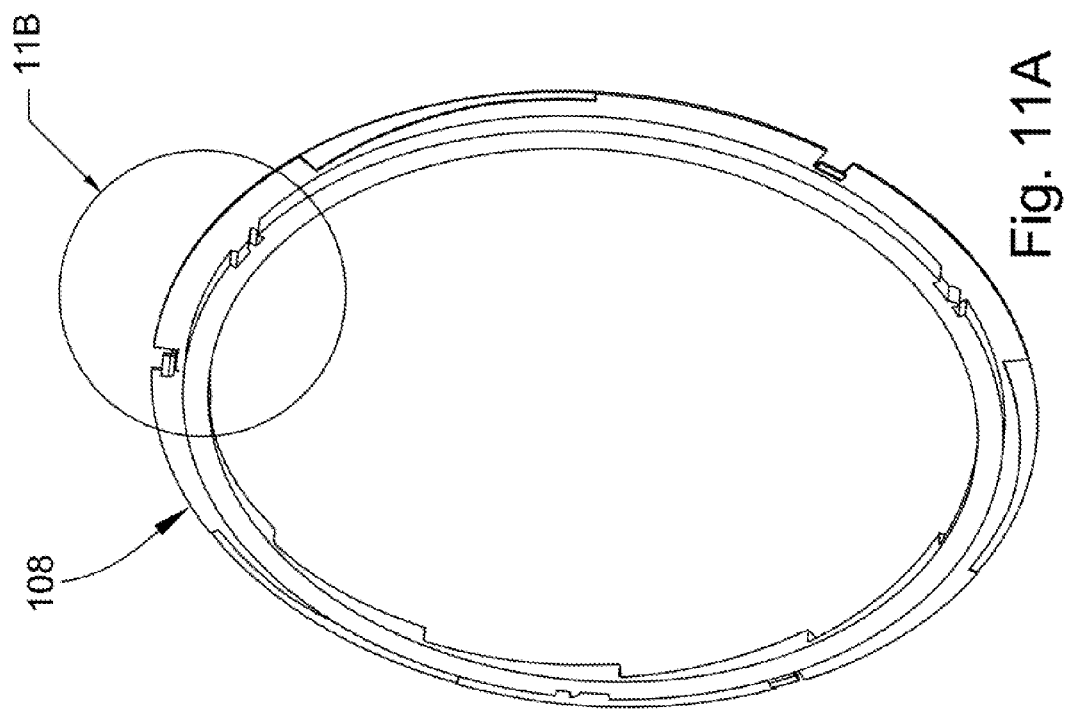
Fig. 11B
Fig. 11A

RING SHAPED AXIAL WEAR COMPENSATION DEVICE

CROSS-REFERENCE TO RELATED APPLICATIONS

This application is filed under 35 U.S.C. §120 and §365(c) as a continuation of International Patent Application PCT/EP2009/004865, filed Jul. 6, 2009, which application claims the benefit from U.S. Provisional Patent Application No. 61/135,971, filed on Jul. 25, 2008, which applications are incorporated herein by reference in their entireties.

FIELD OF THE INVENTION

The invention relates to a device and method for compensating for wear in a clutch.

BACKGROUND OF THE INVENTION

It is known to provide wear compensation in a clutch. Unfortunately, the known means for providing such compensation have relatively long axial lengths, are complex; and must be assembled in the clutch during the assembly of the clutch Thus, there is a long-felt need for a means of providing wear compensation in a clutch that is axially more compact, less complex, and modular.

BRIEF SUMMARY OF THE INVENTION

The present invention broadly comprises a wear compensating device, including: at a first axial end, an annularly-shaped base element; an index trigger element connected to the base element; a first annularly-shaped element, at least partially rotatable with respect to the base element, engaged with the index trigger element, and at least partially rotatable with respect to the index trigger element; and at a second axial end, opposite the first axial end, a second annularly-shaped element with a first ramp, the second annularly-shaped element engaged with the first annularly-shaped element, rotatable with respect to the first annularly-shaped element, and at least partially rotatable with respect to the base element. In response to a specified amount of displacement by a portion of the index trigger element, the first and second annularly-shaped elements are rotatable to change a circumferential position of the first ramp.

In one embodiment, the device is installable in a clutch with a housing and the portion of the trigger element is radially displaceable by axial contact between the trigger element and the housing. In another embodiment, the device is installable in a clutch with a clutch plate assembly, a spring, and a second ramp. A distal edge of the spring is in an axial position, the first ramp is engagable with the second ramp, and changing a circumferential position of the first ramp is for maintaining the distal edge of the spring in the axial position. In a further embodiment, the first ramp or the base element is in an axial position, an axial length of the clutch plate assembly is decreasable by an amount and changing a circumferential position of the first ramp is for axially shifting the axial position by substantially the amount. In yet another embodiment, the device includes a first axial length, the device is installable in a clutch with a clutch plate assembly, a spring, and a second ramp, the clutch plate assembly includes a second axial length, the first ramp is engagable with the second ramp, and for a decrease in the second axial length, changing a circumferential position of the first ramp is for increasing the first axial length.

In one embodiment, the base element includes a slot, the first annularly-shaped element includes a protrusion, first and second slots, and a first elastically deformable element, the first slot for the first annularly-shaped element includes at least one circumferential step, the protrusion for the first annularly-shaped element is disposed in the slot for the base element and is displaceable in the slot, the portion for the trigger element is disposed in the first slot for the first annularly-shaped element, the first annularly-shaped element is displaceable with respect to the protrusion for the trigger element and the at least one circumferential step is engageable with the protrusion for the trigger element, the second annularly-shaped element includes a protrusion disposed in the second slot for the first annularly-shaped element and displaceable within the second slot, the first deformably elastic element includes first and second ends, the first end in compressive engagement with the first annularly-shaped element, the second end, opposite the first end, compressively engageable with the second annularly-shaped element, and the device includes a second deformably elastic element with a first end fixed with respect to the base element and with a second end in compressive engagement with the protrusion for the second annularly-shaped element.

In another embodiment, the second elastic element is for urging the second annularly-shaped element in a rotational direction, the first elastic element is for urging the first annularly-shaped element in the rotational direction, in a non-wear mode the protrusion for the trigger element is in contact with a step from the at least one step to rotationally fix the first annularly-shaped element in the direction and the first elastic element is held in a compressed state by the second annularly-shaped element. In a further embodiment, the second elastic element is for urging the second annularly-shaped element in a rotational direction, the first elastic element is for urging the first annularly-shaped element in the rotational direction, and wherein in a wear mode: displacing a portion of the trigger element is for disengaging the portion of the trigger element from the step to enable rotation of the first annularly-shaped element in the direction; and rotation of the first annularly-shaped element is for enabling rotation of the second annularly-shaped element in the rotational direction.

In one embodiment, the device is installable in a clutch with a clutch plate assembly, a spring, and a second ramp, the second ramp is in an axial position, the clutch plate assembly has a decreasable axial length, the first ramp is engageable with the second ramp, the portion of the trigger element is displaceable in response to a decrease in the axial length, and rotation of the second annularly-shaped element in the rotational direction is for maintaining the second ramp in the axial position. In another embodiment, in a non-wear mode, the first elastic element is held in a compressive state by the second annularly-shaped element, enabling rotation of the first annularly-shaped element in the rotational direction is for relieving the compressive state, and enabling rotation of the second annularly-shaped element in the rotational direction is for recompressing the first elastic element.

The present invention further broadly comprises a method for compensating for wear in a clutch.

It is a general object of the present invention to provide a device and a method for compensating for wear in a clutch.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 3A is a front perspective view of the device shown in FIG. 2;

FIG. 3B is a detail of area 3B shown in FIG. 3A;

FIG. 4A is a front perspective view of the device shown in FIG. 2 with the ramp element removed;

FIG. 4B is a detail of area 4B shown in FIG. 4A;

FIG. 6 is a perspective view of the index trigger element shown in FIG. 2;

FIG. 7 is a partial cross-sectional view of the device shown in FIG. 2 installed in a clutch and in a non-wear position;

FIG. 8A is a front perspective view of the base element in FIG. 2 with a deformably resilient element;

FIG. 8B is a detail of area 8B shown in FIG. 8A;

FIG. 9A is a front perspective view of an annularly-shaped element in FIG. 2;

FIG. 9B is a detail of area 9B shown in FIG. 9A;

FIG. 10A is a front perspective view of an annularly-shaped element in FIG. 2;

FIG. 10B is a detail of area 10B shown in FIG. 10A;

FIG. 11A is a back perspective view of the annularly-shaped element in FIG. 10A;

FIG. 11B is a detail of area 11B shown in FIG. 11A; and,

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
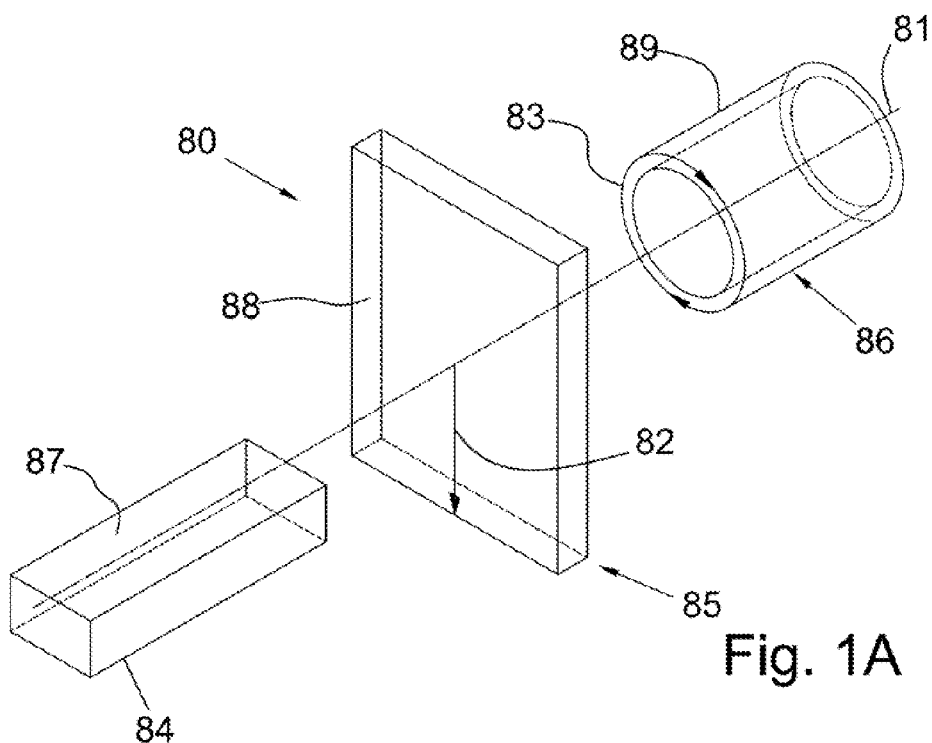
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
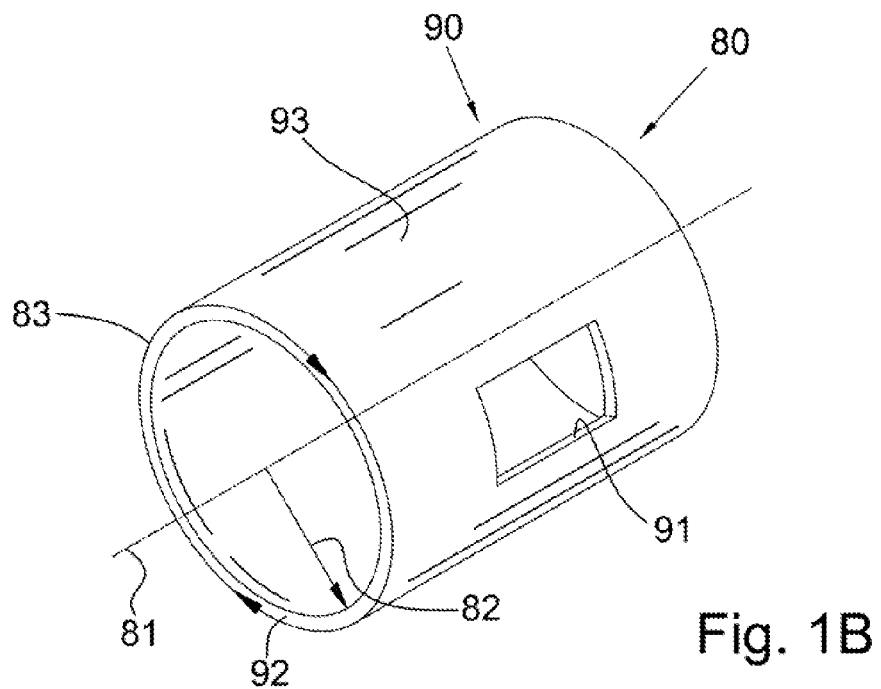
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
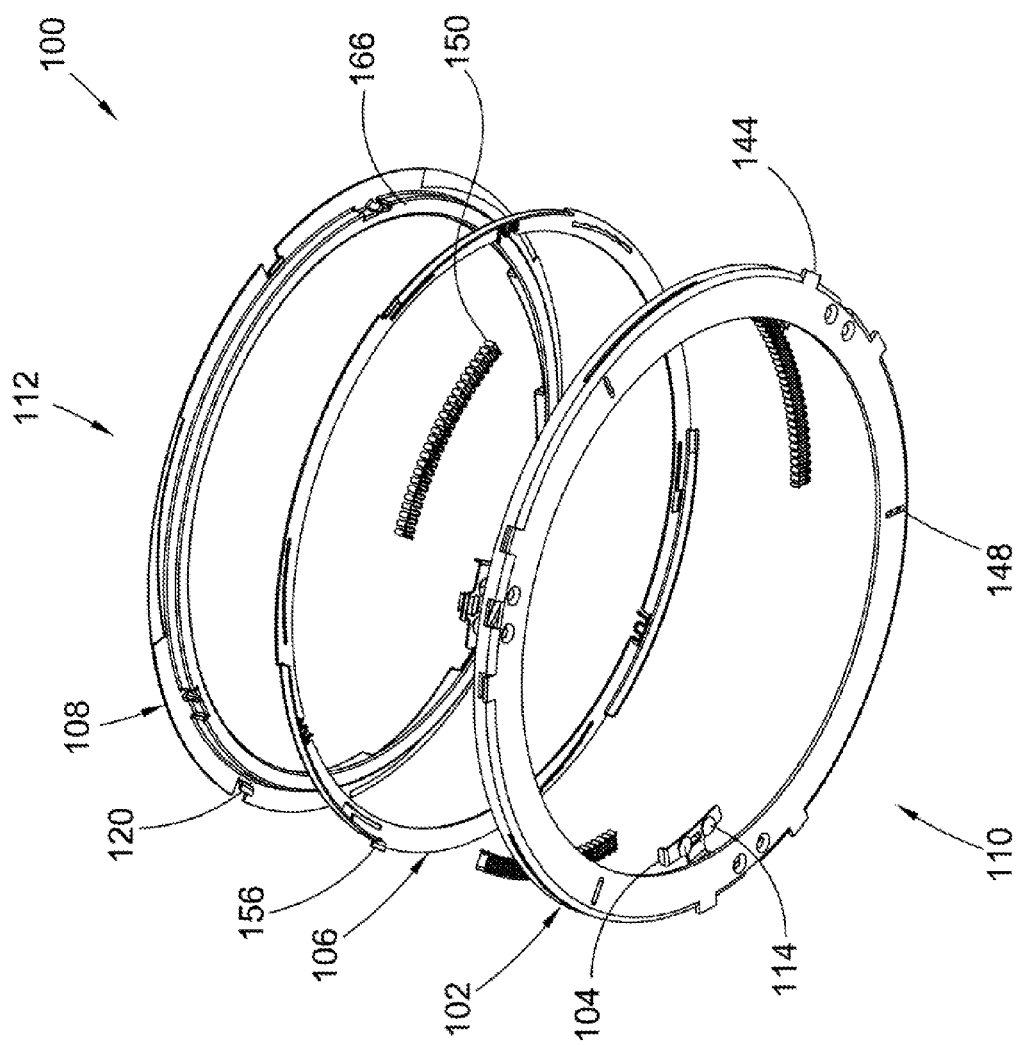
FIG. 2 is a back exploded view of a present invention device.

FIG. 2 is a back exploded view of a present invention device.

FIG. 3A is a front perspective view of device 100 shown in FIG. 2.

FIG. 3B is a detail of area 3B shown in FIG. 3A.

FIG. 4A is a back perspective view of device 100 shown in FIG. 2 with the ramp element removed.

FIG. 4B is a detail of area 4B shown in FIG. 4A.

Figure 5:
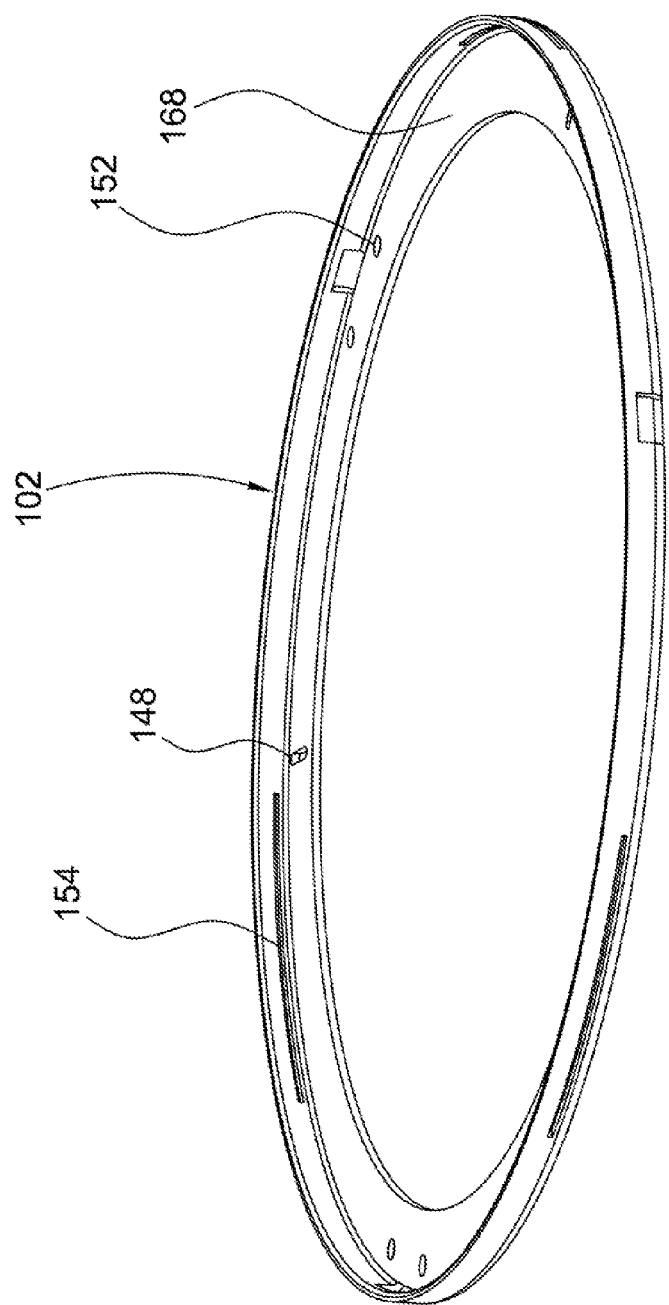
FIG. 5 a front perspective view of the base element shown in FIG. 2.
Figure 12:
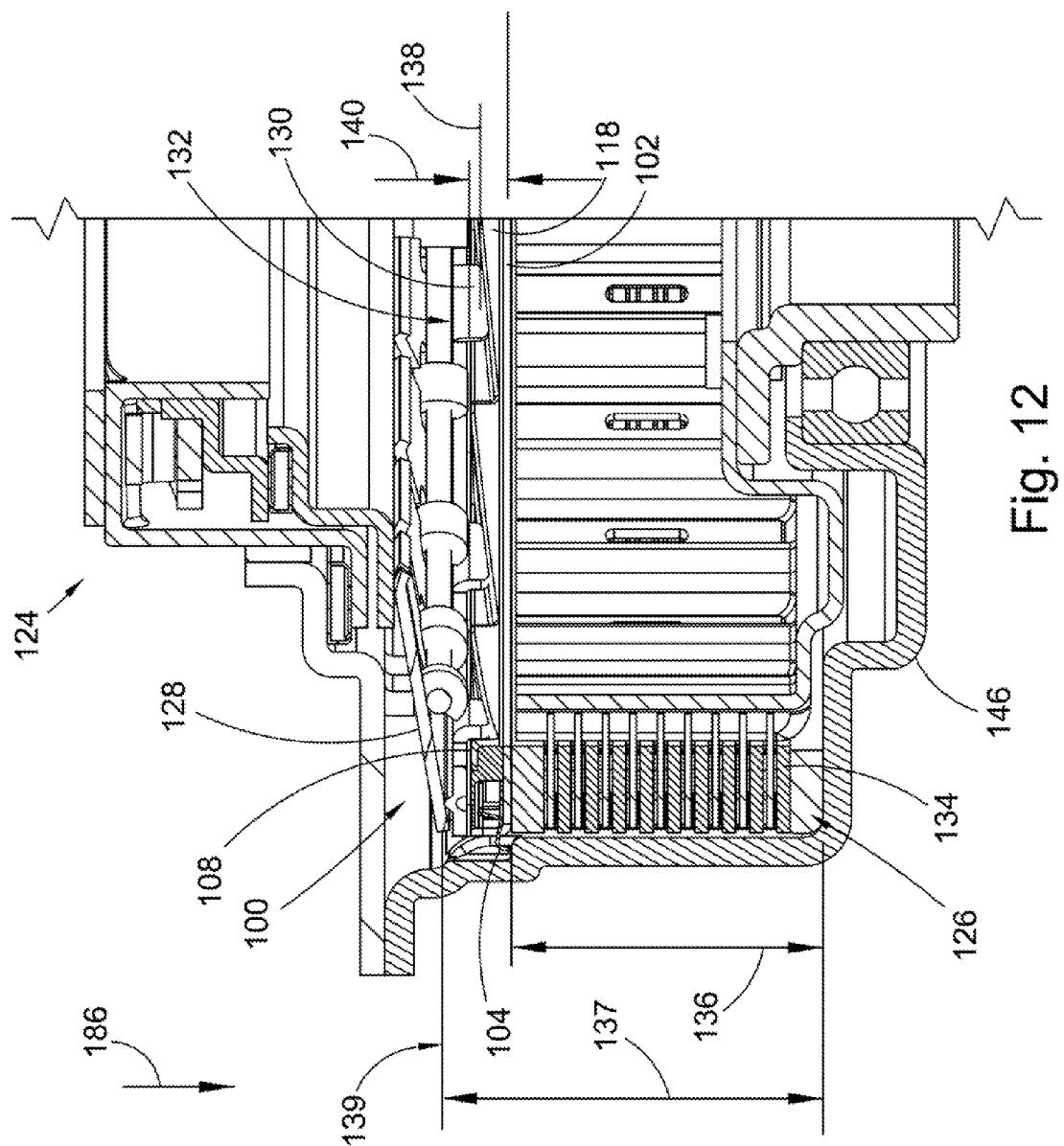
FIG. 12 is the partial cross-sectional view of FIG. 7 in a wear position.

FIG. 5 a front perspective view of the base element shown in FIG. 2.

FIG. 6 is a perspective view of the index trigger element shown in FIG. 2.

FIG. 7 is a cross-sectional view of device 100 shown in FIG. 2 installed in a clutch.

FIG. 8B is a detail of area 8A shown in FIG. 8A.

FIG. 7 is the partial cross-sectional view of FIG. 2 in a non-wear position. The following should be viewed in light of FIGS. 2 through 7. Device 100 includes an annularly-shaped base element 102, index trigger element 104 connected to the base element, annularly-shaped index element 106, and annularly-shaped ramp element 108. The base element is located at axial end 110 of the device and element 108 is located at opposite axial end 112 of the device. Element 104 is connected to the base element by any means known in the art, for example, rivets 114. Element 106 is at least partially rotatable with respect to the base element as further described infra. Element 106 also is engaged with the index trigger element, for example, portion 116, and is at least partially rotatable with respect to the index trigger element as further described infra. Element 108 includes at least one ramp 118. In one embodiment, element 108 includes a plurality of ramps 118.

Element 108 is engaged with element 106, for example, tabs 120 of element 108 pass through slots 122 in element 106, and is rotatable with respect to element 106 as further described infra. It is understood that device 100 is not limited to the number, shape, or configuration of tabs and slots shown in the figures. In response to a specified amount of displacement by the index trigger element, for example, portion 116, elements 106 and 108 are rotatable to change a circumferential position of ramps 118, as further described infra.

The following discussion is directed toward device 100 in clutch 124; however, it should be understood that the discussion is applicable to the use of device 100 in other types of clutches. Clutch 124 includes clutch plate assembly 126, spring 128, used to operate the clutch, and at least one ramp 130 on plate 132, disposed between the clutch plate assembly and the spring. It is understood that device 100 is not limited to use with the configuration shown for clutch 124 and that device 100 is usable with other types and configurations of clutches. For example, device 100 is not limited to use with a clutch having the number of clutch plates 134 shown in assembly 126. As further described infra, device 100 operates to compensate for wear in a clutch in which the device is installed, for example, clutch 124. In general, as stack height 136 of the clutch assembly decreases, for example, by wear of the parts, such as clutch plates 134, device 100 expands to maintain adjustment of the clutch in a constant position. For example, axial position 139 of the spring, for example, a distal edge of the spring, is kept constant so that travel of parts used to operate the spring also is kept constant. Alternately stated, distance 137 between the housing and the spring is kept constant.

As an example, in one embodiment, ramps 130 are facing away from the spring and the base element is axially engaged with the clutch plate assembly. That is, plate 132 is axially disposed between the spring and device 100. By axially engaged we means that an axial displacement of the clutch plate assembly results in an axial displacement of the base element. Plate 132, specifically ramps 130, is in axial position 138 and ramps 118 and 130 are engaged. While a circumferential position of ramp 118 is changed, ramps 130, and plate 132, are maintained in axial position 138. That is, in response to a decrease in height 136, the base element 'drops' toward the clutch plate assembly and ramps 118 displace along ramps 130 to take up the decrease in height 136 and maintain plate 132 in position 138 so that the axial position of the spring does not change or only changes nominally. Ramps 118 are rotated such that axially highest portion 141 moves toward the axially highest portion of ramps 130. Thus, changing a circumferential position of ramps results in axially shifting the base element by approximately the change in height 136.

As an example, in another embodiment (not shown), ramps 130 are facing the spring and axially engaged with the clutch plate assembly, and the base element is axially engaged with the spring. That is, plate 132 is axially disposed between the clutch plate assembly and device 100. The base plate is in an axial position and ramps 118 and 130 are engaged. While a circumferential position of ramp 118 is changed, the base plate is maintained in the axial position. That is, in response to a decrease in height 136, plate 130 'drops' toward the clutch plate assembly and ramps 118 displace along ramps 130 to take up the decrease in height 136 and maintain element 102 in the previously described axial position so that the axial position of the spring does not change or only changes nominally. Thus, changing a circumferential position of ramps results in axially shifting element 108 by approximately the change in height 136.

In a further embodiment, device 100 includes axial length 140 and for a decrease in height 136, changing a circumferential position of ramps 118 results in an increase in length 140.

FIG. 8A is a front perspective view of base element 100 in FIG. 2 with deformably resilient element 150.

FIG. 8B is a detail of area 8B shown in FIG. 9A.

FIG. 9A is a front perspective view of an annularly-shaped element in FIG. 2.

FIG. 9B is a detail of area 9B shown in FIG. 10A.

FIG. 10A is a front perspective view of an annularly-shaped element in FIG. 2.

FIG. 10B is a detail of area 10B shown in FIG. 10A.

FIG. 11A is a back perspective view of the annularly-shaped element in FIG. 10A.

FIG. 11B is a detail of area 11B shown in FIG. 11A. The following should be viewed in light of FIGS. 2 through 12. The following is a description of an example method of assembling an example configuration of device 100. Feature 144, for example, one or more protrusions, are used to rotationally connect the base element with a clutch, for example, clutch 124. That is, feature 144 prevents rotation of the base element with respect to the clutch, for example, clutch housing 146.

To assemble device 100, slot 148 is used to engage the base element with a mating fixture member (not shown) that serves to locate the base element on the fixture during assembly. Element 150 is laid on the base element. One end of the element engages the mating fixture member, to act as a temporary stop to facilitate capture of element 150 for ease of assembly. In one embodiment, element 150 is a spring. Hole features 152 are used to affix the trigger element to the base element, for example, by rivets 114. Slot feature 154 engages tab feature 156 of element 106 to capture element 106 within the base element. Element 106 is snapped into the base element during assembly. Rotary motion of element 106 is limited by portion 116 of the trigger element, which is disposed in ratchet slot 158 of element 106.

Portion 116 engages the first tooth, tooth 160, of the ratchet slot. Tab, or protrusion, 120 of element 108 lays into cutout feature 162 of slot 122 in the index element, enabling bottom surface 166 to mate with surface 168 of the base ring. The other end of element 150 is engaged with tab 120. Pocket, or indent, 169 provides space for tip 170 of resilient element 171 when the ramp element is inserted into the assembly. The tip is placed in portion 172 of the pocket and rotation of plate 108 slides the tip across ramp 173 into portion 174. In one embodiment, element 171 is a spring. That is, the ramp element is rotatable about a rotational axis for the device until tip 170 travels over ramp 173 and is captured in pocket, or indent, 174. This action also moves tab 120 from cut out feature 162 into capture portion 180 of slot 122, capturing element 108 in device 100.

Device 100 can now be lifted off the locating fixture, releasing element 150, which pushes protrusion 120 in a rotational direction, for example, counterclockwise as configured in FIG. 3A, causing the ramp element to turn counterclockwise to push tab 120 towards end 182 of slot 122. Pushing end 182 rotates element 106 until step 160 engages portion 116 (which is fixed with respect to element 106). Through the engagement of step 160 with portion 116, element 106 torques against the trigger element, preventing further rotation of the index element. Element 150 continues to push the ring element until element 171 is compressed, forcing element 106 to bias towards rotating in a counterclockwise direction. Thus, element 108 pushes on 106 until elements 106, 108, 150 and 171 reach a static balance. Device 100 is then placed inside a clutch assembly, for example, as shown in FIG. 7. Tabs 144 prevent rotation of the base element relative to the clutch housing, for example, housing 126. Trigger sensor tab 184 rests against a fixed flat surface feature in the clutch assembly.

The following provides further detail regarding operation of device 100. As clutch plates 134 wear and the clutch is closed (spring 128 pushes assembly 126 closed), the base element displaces in direction 186 toward the plates. Protrusion, or tab, 184 of the trigger element is in contact with housing 146 and the trigger element is connected to the base element. Therefore, as the base element drops, the trigger element also drops. However, tab 184 is resting on the housing and cannot move; therefore, the trigger element tips, displacing portion 116 radially inward. If the drop of the base element and the tipping of portion 116 is sufficiently large, portion 116 is tipped enough to clear step 160, freeing element 106 to rotate counterclockwise in response to the force exerted by element 171. Portion 116 then engages the next step, or tooth, in slot 158, for example, step 188. Meanwhile, spring 128 keeps the clutch engaged by applying full force on the ramp element.

The ramp element does not rotate during the displacement of portion 116 in slot 158. In one embodiment, ramp angle 192 on ramp 118 and the angle for ramp 130 are chosen to be the same and such that the frictional force at the interface of the ramps is high enough to prevent any relative motion between ramp 118 and ramp 130 when clutch 124 is engaged. In another embodiment the ramp angle is determined mathematically such that: Tan(ramp angle)<coefficient of friction at the interface of ramp 118 and ramp 130. In a further embodiment, the coefficient of friction is increased by any means known in the art, for example, for riffling one or both of the ramp surfaces, for example, surface 194 and the ramp angle is made low to keep the value of Tan(ramp angle) low. The rotational locking of the ramps prevents plate 108 from applying torque to the index element during the period when the entire axial force of spring 128 is acting on device 100. Also, the axial force from spring 128 causes frictional force between the ramp element and the base element, preventing the ramp element from rotating counterclockwise to follow element 106.

The axial force from spring 128 is removed when the clutch is disengaged. If plates 134 have worn sufficiently, as noted supra, portion 116 has moved to step 188 due to the release of energy from element 171 which causes element 106 to rotate. When the clutch is disengaged, element 150 reacts to the release of energy by element 174 (element 171 is no longer opposing element 150) by rotating the ramp element to re-compress element 171 until an equilibrium is reached between the resilient elements. In the process, element 108 is rotated by element 150 such that ramps 118 move across ramps 130, pushing element 108 down to compensate for the drop of the base element. That is, ramp 118 is rotated so that the axially highest portion 141 of the ramp is rotated toward the axially highest portion of ramp 130. The system is now ready for the next wear adjustment.

The following should be viewed in light of FIGS. 2 through 12. The following describes a present invention method for compensating for wear in a clutch. Although the method is presented as a sequence of steps for clarity, no order should be inferred from the sequence unless explicitly stated. A first step installs a wear-compensating device in the clutch so that a base element and a first annularly-shaped element for the wear-compensating device are disposed in a housing for the clutch; a second step, in response to a reduction in an axial length of the at least one clutch plate, displaces a portion of a trigger element by contact with the housing, the trigger element connected to the base element; a third step, in response to displacing the trigger element, rotates the first annularly-shaped element in a rotational direction; a fourth step displaces a second ramp on the first annularly-shaped element along the first ramp; and a fifth step increases an axial length of the wear-compensating device in response to displacing the second ramp.

In one embodiment, the clutch includes a spring in an axial position and a sixth step maintains the spring in substantially the axial position in response to increasing the axial length of the wear-compensating device. In another embodiment, the base element or the second annularly-shaped element is in an axial position and a seventh step maintains the base element or the second annularly-shaped element in substantially the axial position in response to increasing the axial length of the wear-compensating device. In a further embodiment, increasing the axial length of the wear-compensating device includes axially displacing the base element or the first annularly-shaped element.

In one embodiment, an eighth step closes the clutch and, in response to displacing the portion of the trigger element: a ninth step disengages the portion of the trigger element from a step in a slot for a second annularly-shaped element for the device; a tenth step rotationally displaces the second annularly-shaped element in the direction by at least partially releasing compression in a first elastically deformable element engaged with the first and second elements; and an eleventh step engages the portion of the trigger element with the slot to rotationally connect the trigger element and the second annularly-shaped element. In another embodiment, a twelfth step opens the clutch and rotating the first annularly-shaped element in the rotational direction includes rotationally displacing the first annularly-shaped element by at least partially releasing compression in a second elastically deformable element engaged with the first element and the base element.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:
1. A wear compensating device, comprising:
at a first axial end, an annularly-shaped base element;
an index trigger element connected to the base element;
a first annularly-shaped element, at least partially rotatable with respect to the base element, engaged with the index trigger element, and at least partially rotatable with respect to the index trigger element; and,
at a second axial end, opposite the first axial end, a second annularly-shaped element with a first ramp, the second annularly-shaped element engaged with the first annularly-shaped element, rotatable with respect to the first annularly-shaped element, and at least partially rotatable with respect to the base element, wherein in response to a specified amount of displacement by a portion of the index trigger element, the first and second annularly-shaped elements are rotatable to change a circumferential position of the first ramp.

2. The device of claim 1, wherein the device is installable in a clutch with a housing and the portion of the trigger element is radially displaceable by axial contact between the trigger element and the housing.

3. The device of claim 1, wherein the device is installable in a clutch with a clutch plate assembly, a spring, and a second ramp, wherein a distal edge of the spring is in an axial position, wherein the first ramp is engageable with the second ramp, and wherein changing a circumferential position of the first ramp is for maintaining the distal edge of the spring in the axial position.

4. The device of claim 3, wherein the first ramp or the base element is in an axial position, wherein an axial length of the clutch plate assembly is decreasable by an amount and wherein changing a circumferential position of the first ramp is for axially shifting the axial position by substantially the amount.

5. The device of claim 1, wherein the device includes a first axial length, wherein the device is installable in a clutch with a clutch plate assembly, a spring, and a second ramp, wherein the clutch plate assembly includes a second axial length, wherein the first ramp is engageable with the second ramp, and wherein for a decrease in the second axial length, changing a circumferential position of the first ramp is for increasing the first axial length.

6. The device of claim 1, wherein the base element includes a slot, the first annularly-shaped element includes a protrusion, first and second slots, and a first elastically deformable element, wherein the first slot for the first annularly-shaped element includes at least one circumferential step, wherein the protrusion for the first annularly-shaped element is disposed in the slot for the base element and is displaceable in the slot for the base element, wherein the portion for the trigger element is disposed in the first slot for the first annularly-shaped element, wherein the first annularly-shaped element is displaceable with respect to the protrusion for the trigger element and the at least one circumferential step is engageable with the protrusion for the trigger element, wherein the second annularly-shaped element includes a protrusion disposed in the second slot for the first annularly-shaped element and displaceable within the second slot, wherein the first deformably elastic element includes first and second ends, the first end in compressive engagement with the first annularly-shaped element, the second end, opposite the first end, compressively engageable with the second annularly-shaped element, and the device further comprising a second deformably elastic element with a first end fixed with respect to the base element and with a second end in compressive engagement with the protrusion for the second annularly-shaped element.

7. The device of claim 6, wherein the second elastic element is for urging the second annularly-shaped element in a rotational direction, wherein the first elastic element is for urging the first annularly-shaped element in the rotational direction, wherein in a non-wear mode the protrusion for the trigger element is in contact with a step from the at least one step to rotationally fix the first annularly-shaped element in the direction and wherein the first elastic element is held in a compressed state by the second annularly-shaped element.

8. The device of claim 6, wherein the second elastic element is for urging the second annularly-shaped element in a rotational direction, wherein the first elastic element is for urging the first annularly-shaped element in the rotational direction, and wherein in a wear mode:
displacing a portion of the trigger element is for disengaging the portion of the trigger element from the step to enable rotation of the first annularly-shaped element in the direction; and,
rotation of the first annularly-shaped element is for enabling rotation of the second annularly-shaped element in the rotational direction.

9. The device of claim 6, wherein the device is installable in a clutch with a clutch plate assembly, a spring, and a second ramp, wherein the second ramp is in an axial position, wherein the clutch plate assembly has a decreasable axial length, wherein the first ramp is engageable with the second ramp, wherein the portion of the trigger element is displaceable in response to a decrease in the axial length, and wherein rotation of the second annularly-shaped element in the first rotational direction is for maintaining the second ramp in the axial position.

10. The device of claim 6, wherein in a non-wear mode, the first elastic element is held in a compressive state by the second annularly-shaped element, wherein enabling rotation of the first annularly-shaped element in the first rotational direction is for relieving the compressive state, and wherein enabling rotation of the second annularly-shaped element in the first rotational direction is for recompressing the first elastic element.

11. A clutch, comprising:
a housing;
at least one clutch plate disposed in the housing and having a first axial length;
a spring for axially compressing the at least one clutch plate;
a first ramp; and,
a wear compensation device, disposed in the housing and including:
a second axial length;
an annularly-shaped base element;
an index trigger element connected to the base element and including a portion displaceable by contact with the housing;
a first annularly-shaped element at least partially rotatable with respect to the base element, engaged with the index trigger element, and at least partially rotatable with respect to the index trigger element; and,
a second annularly-shaped element with a second ramp engaged with the first ramp, the second annularly-shaped element engaged with the first annularly-shaped element and at least partially rotatable with respect to the first annularly-shaped element, wherein in response to a specified amount of displacement by the portion of the index trigger element, the second annularly-shaped element is rotatable for displacing the second ramp along the first ramp to increase the second axial length in response to a decrease in the first axial length.

12. The clutch of claim 11, wherein displacing the second ramp along the first ramp is for axially displacing the base element.

13. The clutch of claim 11, wherein displacing the second ramp along the first ramp is for axially displacing the second annularly-shaped element.

14. The device of claim 11, wherein the base element or the second annularly-shaped element is axially displaceable in response to a reduction in the first axial length and wherein the portion of the trigger element is displaceable in response to the axial displacement of the base element.

15. A method for compensating for wear in a clutch, comprising:
installing a wear-compensating device in the clutch so that a base element and a first annularly-shaped element for the wear-compensating device are disposed in a housing for the clutch;

in response to a reduction in an axial length of at least one clutch plate, displacing a portion of a trigger element by contact with the housing, the trigger element connected to the base element;

in response to displacing the portion of the trigger element, rotating the first annularly-shaped element in a rotational direction;

displacing a second ramp on the first annularly-shaped element along a first ramp; and, increasing an axial length of the wear-compensating device in response to displacing the second ramp.

16. The method of claim 15 wherein the clutch includes a spring in an axial position and the method further comprising maintaining the spring in substantially the axial position in response to increasing the axial length of the wear-compensating device.

17. The method of claim 15 wherein the base element or the second annularly-shaped element is in an axial position and the method further comprising maintaining the base element or the second annularly-shaped element in substantially the axial position in response to increasing the axial length of the wear-compensating device.

18. The method of claim 15 wherein increasing the axial length of the wear-compensating device includes axially displacing the base element or the first annularly-shaped element.

19. The method of claim 15, further comprising:
closing the clutch; and,
in response to pivoting the trigger element:
  disengaging the portion of the trigger element from a step in a slot for a second annularly-shaped element for the device;
  rotationally displacing the second annularly-shaped element in the direction by at least partially releasing compression in a first elastically deformable element engaged with the first and second elements; and,
  engaging the portion of the trigger element with the slot to rotationally connect the trigger element and the second annularly-shaped element.

20. The method of claim 19, further comprising opening the clutch and wherein rotating the first annularly-shaped element in a rotational direction includes rotationally displacing the first annularly-shaped element by at least partially releasing compression in a second elastically deformable element engaged with the first element and the base element.

* * * * *